United States Patent [19]
Bruedigam et al.

[11] Patent Number: 5,992,382
[45] Date of Patent: Nov. 30, 1999

[54] METHOD AND APPARATUS FOR CONTROLLING AN INTERNAL COMBUSTION ENGINE

[75] Inventors: Claus Bruedigam, Tegernheim, Germany; Klaus Eppinger, Toulouse, France; Thomas Pfeufer, Regensburg, Germany

[73] Assignee: Siemens Aktiengesellschaft, Munich, Germany

[21] Appl. No.: 09/033,316

[22] Filed: Mar. 2, 1998

[30] Foreign Application Priority Data

Feb. 28, 1997 [DE] Germany ............... 197 08 243

[51] Int. Cl.$^6$ ............................ F02D 41/04
[52] U.S. Cl. ........................ 123/396; 123/479
[58] Field of Search .................. 123/399, 396, 123/397, 479, 198 D, 630; 73/117.3

[56] References Cited

U.S. PATENT DOCUMENTS 4,780,826  10/1988  Nakano et al. ............. 364/431.03
5,003,954   4/1991  Yakuwa et al. .............. 123/479
5,153,835  10/1992  Hashimoto et al. ......... 364/431.11
5,484,351   1/1996  Zhang et al. ................. 477/117
5,551,396   9/1996  Suzuki et al. ................ 123/399

FOREIGN PATENT DOCUMENTS 39 90 872 T1   2/1990  Germany .
43 14 779 A1  12/1993  Germany .

Primary Examiner—Tony M. Argenbright
Assistant Examiner—Arnold Castro
Attorney, Agent, or Firm—Herbert L. Lerner; Laurence A. Greenberg

[57] ABSTRACT

A method and an apparatus control an internal combustion engine associated with a sensor for sensing a measured variable from which an estimated value of a torque loss of the internal combustion engine is derived. A measured value of the measured variable is determined at prescribed time intervals in each case. The measured values are corrected in such a way that a drop in the corrected measured values within a prescribed time interval is limited to a prescribed drop value.

8 Claims, 5 Drawing Sheets

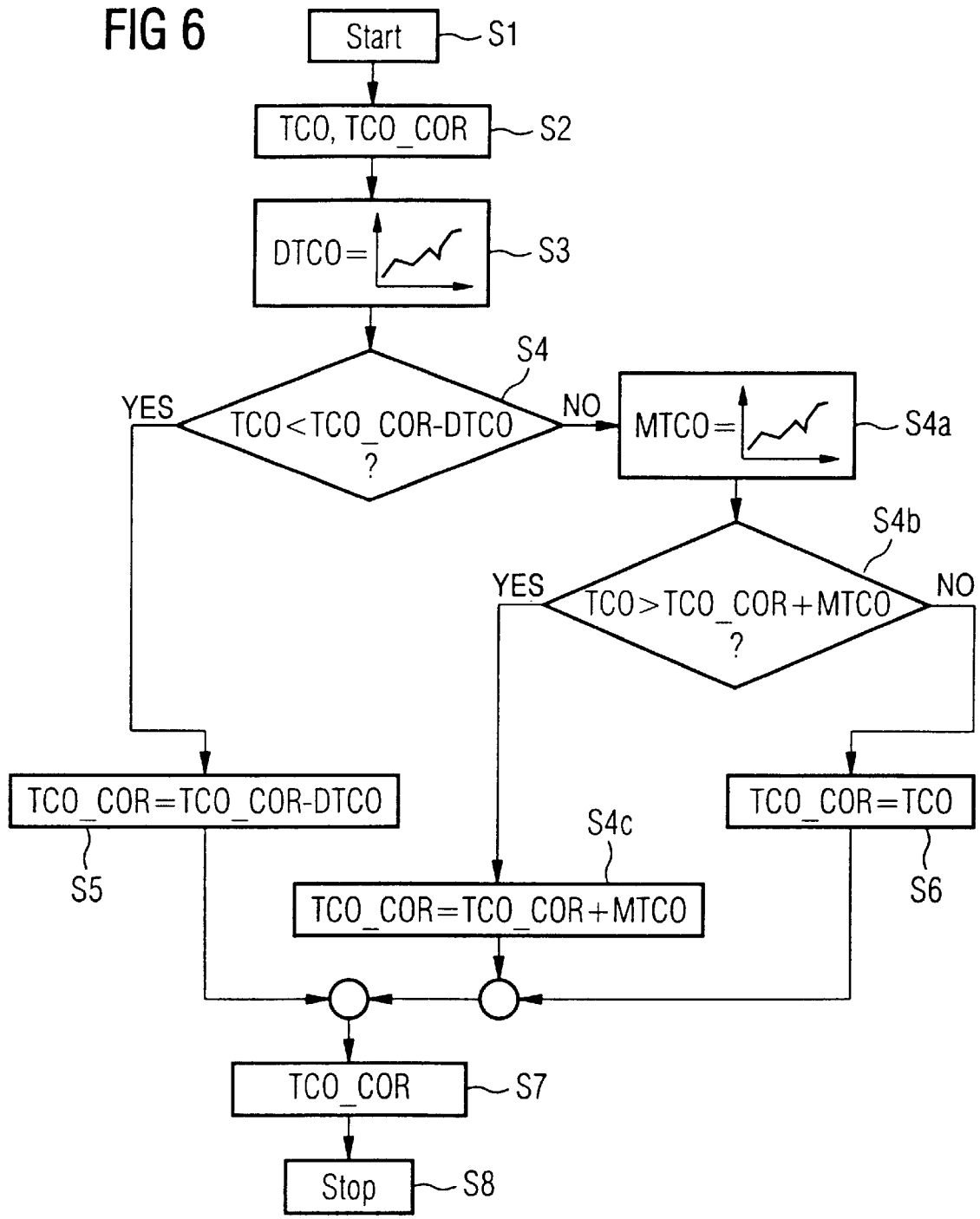

METHOD AND APPARATUS FOR CONTROLLING AN INTERNAL COMBUSTION ENGINE

BACKGROUND OF THE INVENTION

Field of the Invention

The invention relates to a method and an apparatus for controlling an internal combustion engine which is associated with a sensor that senses a measured variable from which an estimated value of a torque loss of the internal combustion engine is derived, in which a measured value of the measured variable is determined at prescribed time intervals in each case.

German Published, Non-Prosecuted Patent Application DE 43 04 779 A1 discloses a method and an apparatus for controlling an internal combustion engine. An estimated value of the torque loss is determined through the use of a characteristic diagram from an engine speed and engine temperature, while taking a torque requirement of secondary assemblies such as an air conditioning unit, a generator or a power steering system, into account. Furthermore, the estimated value of the torque loss is adapted through the use of a steady-state deviation of a correction moment contribution of an idling speed regulator. A driver's requested torque is calculated as a function of an accelerator pedal position of an accelerator pedal and an indexed torque is determined therefrom as a function of the estimated value of the torque loss. The indexed torque is then set by prescribing corresponding setpoint values for actuators which influence the torque. The known document does not propose which measures are to be performed for a reliable operation of the internal combustion engine.

Published German Patent Application DE 39 90 872 T1, corresponding to International Publication WO 90/01631, discloses a further method and apparatus for controlling an internal combustion engine. If a failure of a temperature sensor for a cooling water temperature is detected, the control of the internal combustion engine is carried out by assuming a permanently prescribed water temperature (for example 80° C.).

SUMMARY OF THE INVENTION

It is accordingly an object of the invention to provide a method and an apparatus for controlling an internal combustion engine, which overcome the hereinafore-mentioned disadvantages of the heretofore-known methods and apparatuses of this general type and which permit reliable and convenient operation of the internal combustion engine.

With the foregoing and other objects in view there is provided, in accordance with the invention, a method for controlling an internal combustion engine, which comprises sensing a measured variable with a sensor associated with an internal combustion engine; deriving an estimated value of a torque loss of the internal combustion engine from the measured variable; determining a measured value of the measured variable at prescribed time intervals in each case; and correcting the measured values for limiting a drop in the corrected measured values within a prescribed time interval to a prescribed drop value.

In accordance with another mode of the invention, there is provided a method which comprises making the drop value dependent on the corrected measured value of the measured variable at a start of the time interval.

The time interval preferably corresponds to a time interval in which two successive measured values of the measured variable are determined. The estimated value of the torque loss is determined as a function of the corrected measured values. The invention is based in this case on the realization that the measured values of the measured variable from which the estimated value of the torque loss is derived drop more than the prescribed drop value within a prescribed time interval during the operation of the internal combustion engine, only if the sensor which senses the measured variable is faulty. The method according to the invention thus has the advantage of ensuring that a sudden rise in the estimated value of the torque loss is prevented. A sudden rise in the estimated value of the torque loss would result in an undesired sudden acceleration of a vehicle in which the internal combustion engine is disposed, and would thus lead to a degradation of the safe traveling mode.

In accordance with a further mode of the invention, the rise in the corrected measured values within the prescribed time interval is limited to a prescribed rise value. This has the advantage of preventing the estimated value of the torque loss due to a sudden rise in the measured values of the measured variable from dropping suddenly. This ensures that the torque which is actually available at a crankshaft does not decrease suddenly, which would result in a hazard for the vehicle and the driver, in particular during an overtaking maneuver.

In accordance with an added mode of the invention, there is provided a method which comprises making the rise value dependent on the corrected measured value of the measured variable at a start of the time interval.

In accordance with an additional mode of the invention, there is provided a method which comprises sensing cooling water temperature with a temperature sensor.

In accordance with yet another mode of the invention, there is provided a method which comprises sensing oil temperature with a temperature sensor.

In accordance with yet a further mode of the invention, there is provided a method which comprises sensing a degree of fluidity of engine oil with a fluidity sensor.

With the objects of the invention in view, there is also provided, in an internal combustion engine associated with a sensor for sensing a measured variable from which an estimated value of a torque loss of the internal combustion engine is derived, and for determining a measured value of the measured variable at prescribed time intervals in each case, an apparatus for controlling the internal combustion engine, comprising a device for correcting the measured values to limit a drop in corrected measured values within a prescribed time interval to a prescribed drop value.

Other features which are considered as characteristic for the invention are set forth in the appended claims.

Although the invention is illustrated and described herein as embodied in a method and an apparatus for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a further flowchart of an alternative embodiment of the method according to the invention.

DESCRIPTION OF THE PREFERRED EMBODIMENTS

Figure 1:
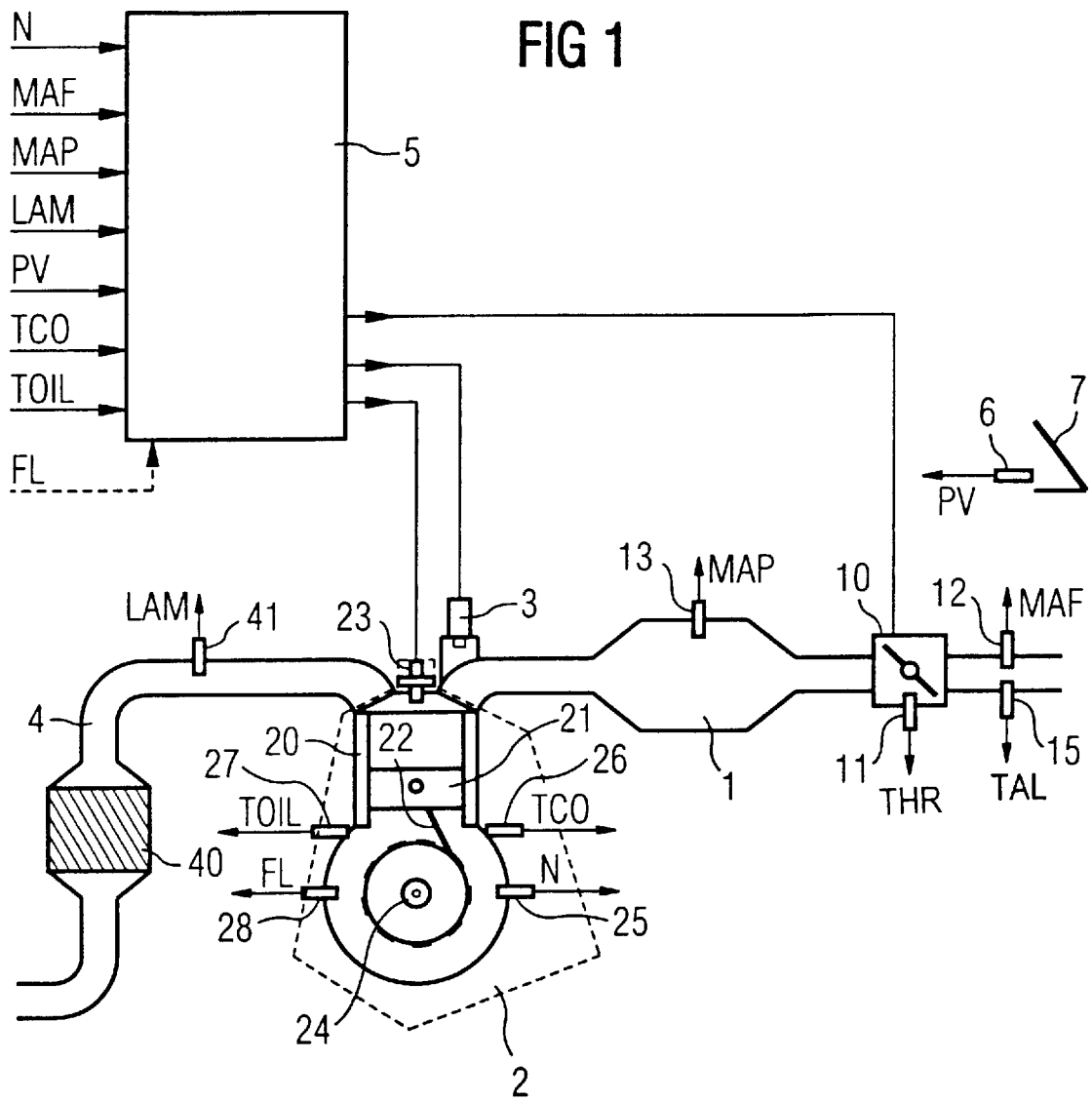
FIG. 1 is a diagrammatic and schematic illustration of an internal combustion engine with an apparatus in accordance with the invention for controlling the internal combustion engine.

Referring now in detail to the figures of the drawings, in which elements with the same structure and function are provided with the same reference symbol and are described only once in each case, and first, particularly, to FIG. 1 thereof, there is seen an internal combustion engine that includes an intake tract 1 in which a throttle valve 10 is disposed, and an engine block 2 that has a cylinder 20 and a crankshaft 24. A piston 21, a connected rod 22 and a spark plug 23 are assigned to the cylinder 20. The connecting rod 22 is connected to the piston 21 and to the crankshaft 24.

The intake tract or tube 1 can also have a non-illustrated bypass for the throttle valve 10. Provision is also made for an injection valve 3 which is assigned to an individual injection system and is disposed in the vicinity of the cylinder 20 in the intake tract 1. The internal combustion engine also includes an exhaust gas tract or tube 4 in which a catalytic converter 40 is disposed. The internal combustion engine is illustrated in FIG. 1 by the cylinder 20. However, it preferably includes a plurality of cylinders. The injection valve 3 can also be assigned to a central injection system or a direct injection system. The internal combustion engine can also have a non-illustrated exhaust gas feedback system with an exhaust gas feedback pipe and an exhaust gas feedback valve.

Provision is made for a control device 5 for the internal combustion engine. The device 5 is assigned sensors which cover various measured variables and which in each case determine the measured value of the measured variable. The control device 5 determines as a function of at least one measured variable, one or more actuation signals which control an actuator unit in each case.

The sensors are a pedal position sensor 6 which senses a pedal position PV of an accelerator pedal 7, a throttle valve position sensor 11 which senses a degree of opening THR of the throttle valve 10, an air flow rate meter 12 which senses an air flow rate MAF and/or an intake manifold pressure sensor 13 which senses an intake manifold pressure MAP, a first temperature sensor 26 which senses a cooling water temperature TCO, a second temperature sensor 27 which senses an oil temperature TOIL, a third temperature sensor 15 which senses an intake air temperature TAL, a rotational speed sensor 25 which senses a rotational speed N of the crankshaft 24, and an oxygen probe 41 which senses a residual oxygen content of the exhaust gas and which assigns an excess air factor LAM thereto.

A fluidity sensor 28 which senses a degree of fluidity FL of the engine oil may be provided as an alternative to the second temperature sensor 27. A viscosity sensor is to be considered in this case as being equivalent to a fluidity sensor.

The invention is not restricted to internal combustion engines which have a throttle valve 10. Depending on the embodiment of the invention, any requested subset of the aforesaid sensors, or even additional sensors, may be provided. In particular, in a cost-effective embodiment of the invention, the air flow rate meter 12 and/or the intake manifold pressure sensor 13 may be dispensed with.

Control units in each case include an actuator drive and an actuator. The actuator drive is an electromotive drive, an electromagnetic drive, a mechanical drive or a further drive known to a person skilled in the art. The actuators are constructed as the throttle valve 10, as the injection valve 3, as the spark plug 23, or as a non-illustrated change-over switch between two different intake manifold lengths. The actuator units are referred to below in each case with the associated actuator.

The control device 5 is preferably constructed as an electronic engine controller. However, it may also include a plurality of control units which are electrically conductively connected to one another, for example through a bus system.

Figure 2:
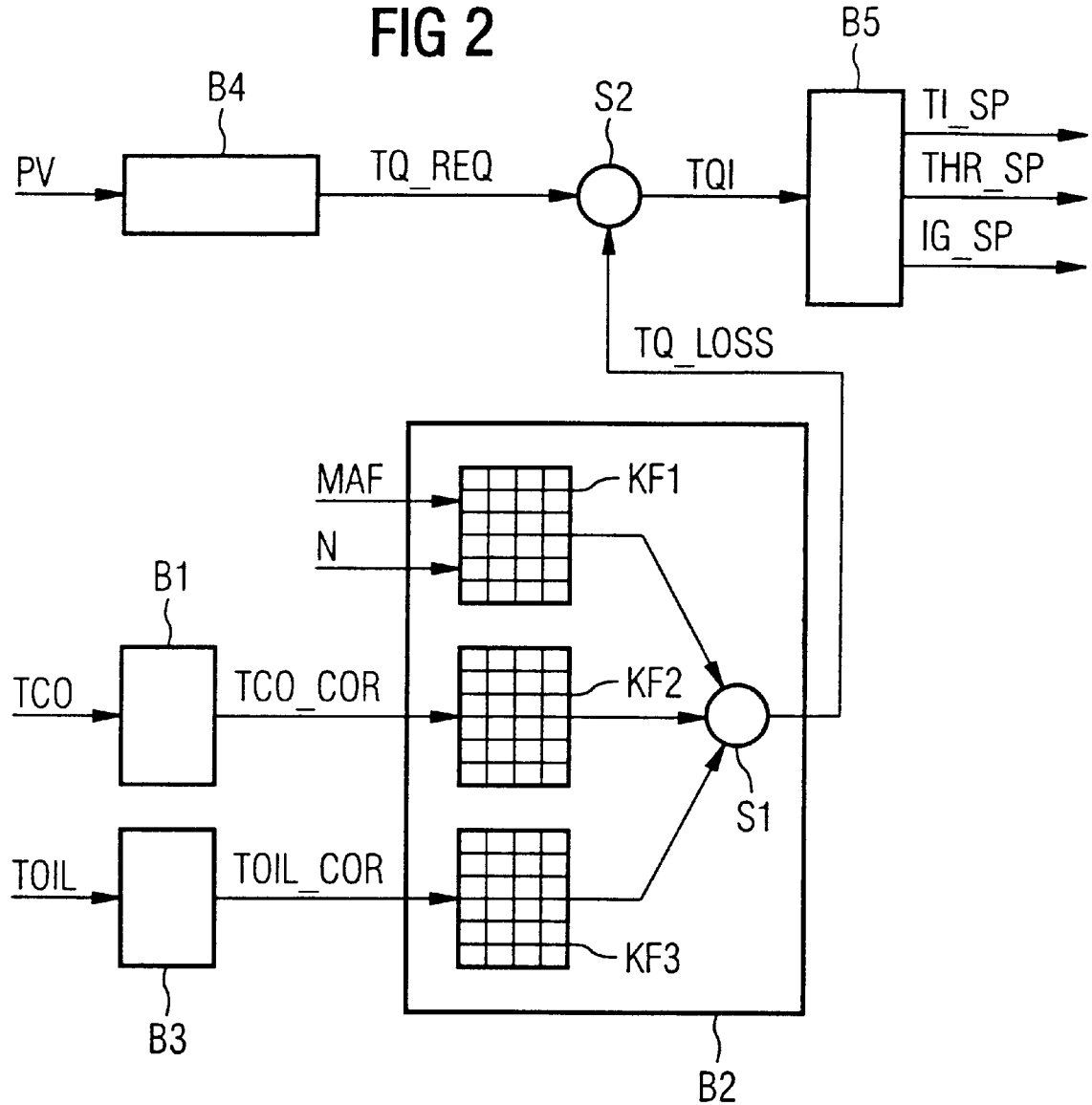
FIG. 2 is a block circuit diagram which shows the control device.

FIG. 2 illustrates a block circuit diagram of a first embodiment of the control device 5. A measured value TCO of the cooling water temperature is corrected in a first block B1 in such a way that a drop in corrected measured values TCO_COR of the cooling water temperature within a prescribed time interval is limited to a prescribed drop value DTCO. The correction in the measured values TCO of the cooling water temperature is described in detail below with reference to FIG. 4.

An estimated value TQ_LOSS of the torque loss of the internal combustion engine is calculated in a second block B2. The estimated value of the torque loss is determined essentially by a power requirement of a cooling water pump, an oil pump, as a result of work consumed by friction in a valve drive, at the piston 21 and an internal wall of the cylinder 20, as a result of work consumed by friction in bearings of the connecting rods 22 and in bearings of the crankshaft 24.

A first torque loss contribution is determined from a first characteristic diagram KF1 as a function of the air flow rate MAF and the rotational speed N. A second torque loss contribution is determined from the corrected measured value TCO_COR of the cooling water temperature from a second characteristic diagram KF2.

A corrected measured value TOIL_COR of the measured value TOIL of the oil temperature is determined in a third block B3. The measured value TOIL of the oil temperature is corrected in such a way that a drop in the corrected measured values within the prescribed time interval is limited to a prescribed drop value DTOIL of the oil temperature. The procedure for correcting the measured value TOIL of the oil temperature is equivalent in this case to that of the correction of the measured value TCO of the cooling water temperature in accordance with the first block B1.

A third torque loss contribution is determined in the second block B2 from a third characteristic diagram KF3 as a function of the corrected measured value TOIL_COR of the oil temperature.

The estimated value TQ_LOSS of the torque loss is determined in a first summing point S1 from a sum of the first, second and third torque loss contributions. In this case, further torque loss contributions which are derived from measured variables may also be taken into account.

A driver's requested torque TQ_REQ is determined in a fourth block B4 at a shaft of the drive train, as a function of the accelerator pedal position PV. The drive train includes not only the internal combustion engine but also a non-illustrated transmission. The shaft of the drive train is preferably the crankshaft 24 or a non-illustrated output shaft of the transmission.

An indexed torque TQI is calculated at a second summing point S2 from a sum of the driver's requested torque TQ_REQ and the estimated value TQ_LOSS of the torque loss.

The indexed torque TQI is then adapted in a fifth block B5 to a torque request of an idling regulator and/or of a traction control system and/or of a rotational speed limiter and/or of a speed limiter and/or of a catalytic converter protection function and/or of an engine torque regulator. Setpoint values for actuators of the internal combustion engine are then calculated as a function of the adapted, indexed torque TQI. Preferably, a setpoint value TI_SP of the injection time period and/or a setpoint value THR_SP of the degree of opening of the throttle valve 10 and/or a setpoint value IG_SP of the ignition angle are calculated. In this case, rapid setting of the indexed torque TQI is advantageously carried out through the use of a change in the setpoint value IG_SP of the ignition angle and a slow change in the indexed torque TQI is advantageously carried out through the use of a change in the setpoint value THR_SP of the degree of opening of the throttle valve 10. The setpoint values are reference variables for control loops for regulating the actuators. The control loops are known per se and therefore are not illustrated herein.

Figure 3:
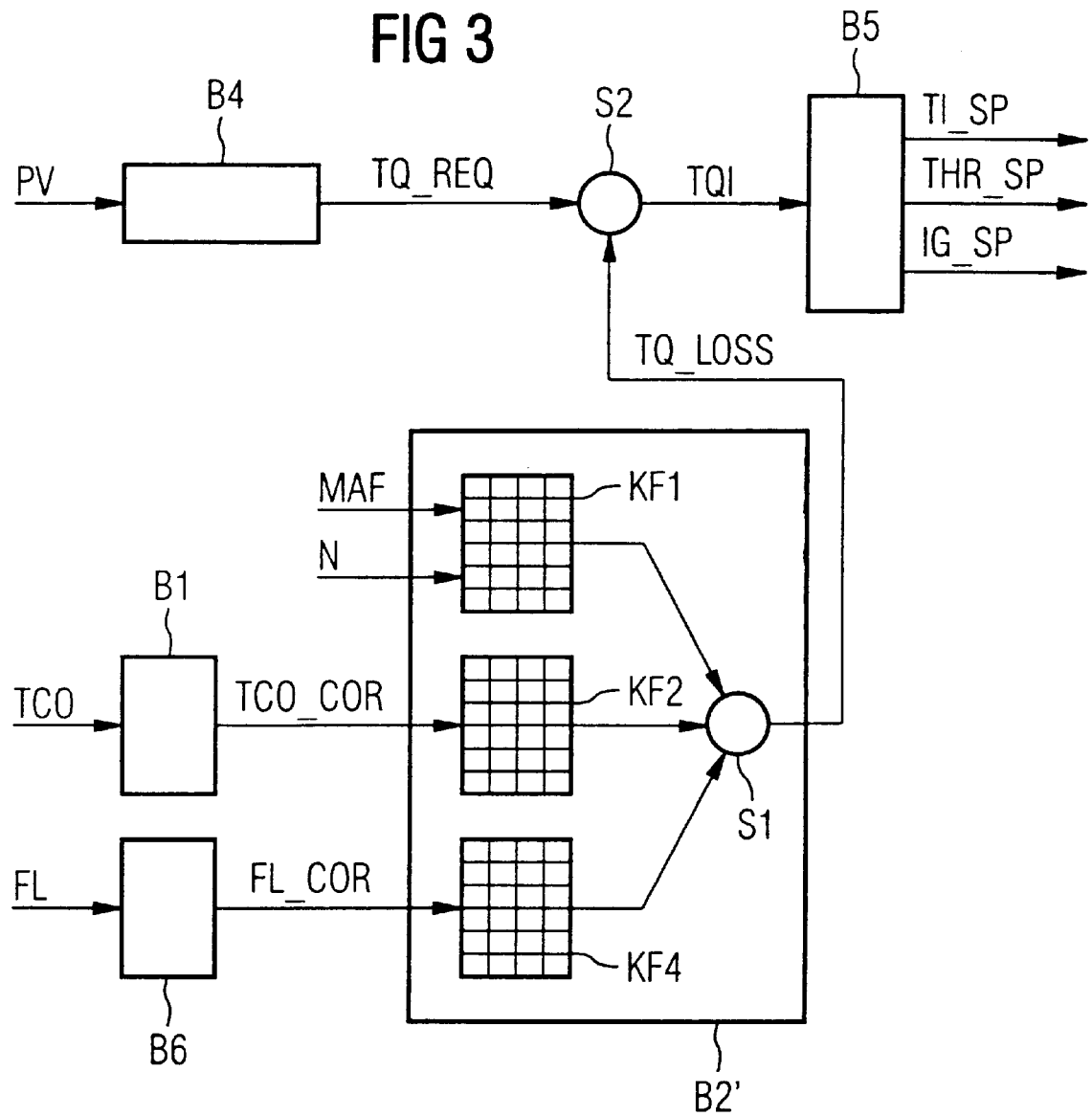
FIG. 3 is a further block circuit diagram of an alternative embodiment of the control device.

FIG. 3 shows a block circuit diagram of a second embodiment of the control device 5. A corrected measured value FL_COR of the fluidity is determined in a sixth block B6 as a function of the measured value FL of the fluidity of the engine oil. The measured values of the fluidity are determined at prescribed time intervals. The measured values FL_COR of the fluidity of the engine oil are then corrected in the block B6 in such a way that the drop in the corrected measured values FL_COR of the fluidity of the engine oil within the prescribed time interval is limited to the prescribed drop value DFL. The procedure for determining the corrected measured value FL_COR is equivalent in this case to the determination of the corrected measured value TCO_COR of the cooling water temperature of the block B1.

The third torque loss contribution is determined in the second block B2' from a fourth characteristic diagram KF4 as a function of the corrected measured value FL_COR of the fluidity.

Figure 4:
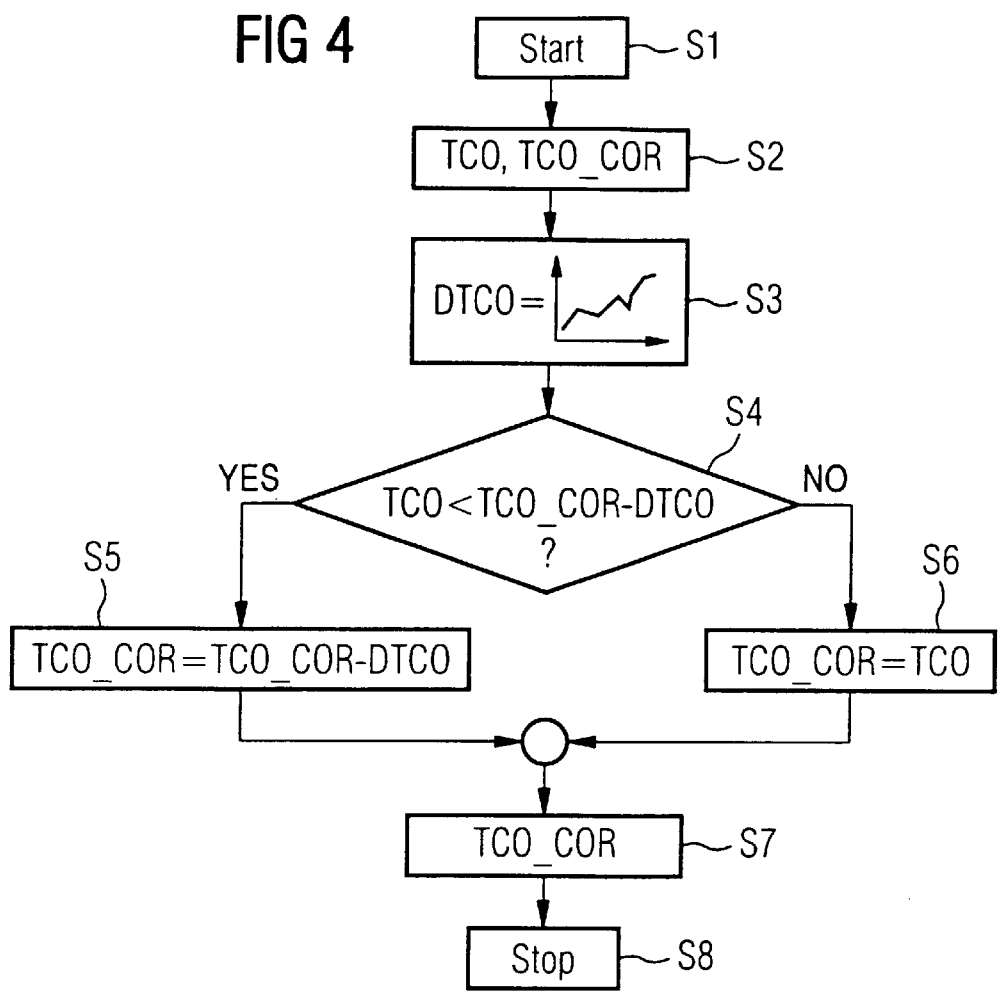
FIG. 4 is a flowchart.

FIG. 4 shows a flowchart in which a corrected measured value TCO_COR of the cooling water temperature is determined. The method is started in a first step S1. The method is started at prescribed time intervals during the operation of the internal combustion engine. The start takes place either cyclically or in synchronism with the crankshaft angle or within a prescribed time period as a function of the computational loading of the control device 5.

In a second step S2, the current measured value TCO of the cooling water temperature is determined and the corrected measured value TCO_COR of the cooling water temperature, such as was calculated at the last call of the method, that is to say at the start of the time interval, is input from a non-illustrated memory. In a third step S3, the drop value DTCO is determined from a fifth characteristic diagram KF5 as a function of the corrected measured value TCO_COR of the cooling water temperature.

The fifth characteristic diagram KF5 is preferably applied in this case in such a way that the drop value DTCO is higher at high corrected measured values TCO_COR of the oil temperature (for example 120° C.) than at low corrected measured values TCO_COR of the cooling water temperature (for example −10° C.). In a simple embodiment of the invention, the drop value DTCO of the cooling water temperature is limited to a fixed value, for example 2° C., with the time interval being 1 s.

In a fourth step S4, a check is performed as to whether or not the measured value TCO of the cooling water temperature is lower than a difference between the corrected measured value TCO_COR and the drop value DTCO of the cooling water temperature. If this is the case, the system branches into a step S5 in which the corrected measured value TCO_COR of the cooling water temperature is assigned the corrected measured value TCO_COR of the cooling water temperature minus the drop value DTCO of the cooling water temperature.

If the condition of the step S4 is not fulfilled, the system branches into a step S6 in which the corrected measured value TCO_COR of the cooling water temperature is assigned the measured value TCO of the cooling water temperature.

In a step S7, the corrected measured value TCO_COR is stored and applied to the output of the first block B1. The method is terminated in a step S8.

Figure 5:
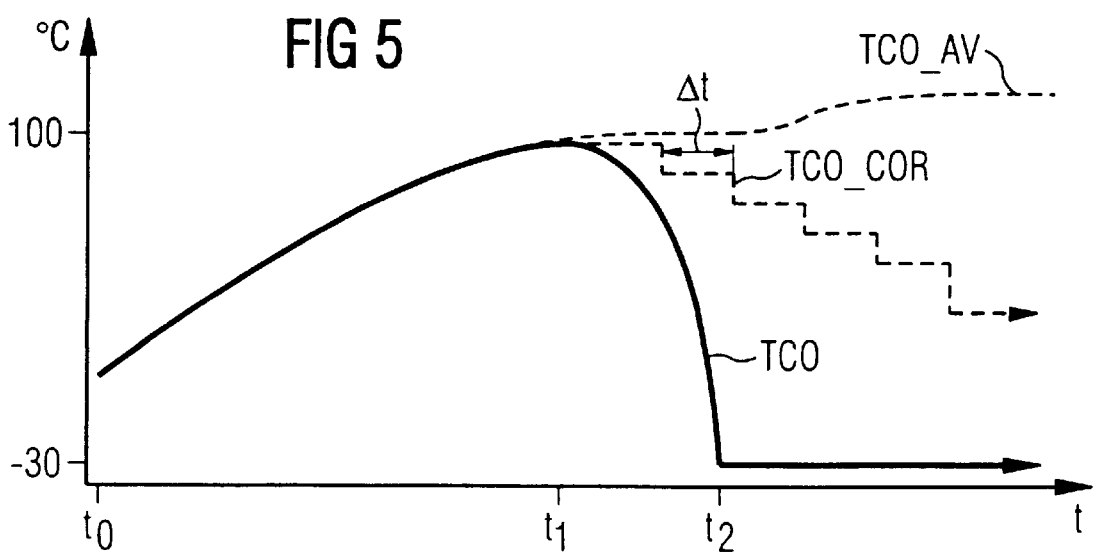
FIG. 5 is a graph showing a time profile of a measured value TCO of a cooling water temperature and of a corrected measured value TCO_COR of the cooling water temperature.

An exemplary time profile of the measured values TCO and of the associated corrected measured values TCO_COR of the cooling water temperature is illustrated in FIG. 5. There is a rise in the measured values TCO of the cooling water temperature from a time to $t_0$ a time $t_1$. From the time $t_1$ to a time $t_2$ the measured values TCO of the cooling water temperature decrease strongly, from approximately 100° C. to −30° C. From the time $t_2$ onwards the measured values TCO of the cooling water temperature remain constant at −30° C. The strong drop in the measured values TCO of the cooling water temperature from the time $t_1$ to the time $t_2$ is due to a drop in the first temperature sensor 26. If the estimated value of the torque loss were to be calculated from the measured value TCO of the cooling water temperature, the estimated value of the torque loss would increase strongly, for example by 60 Nm.

However, since the actual torque loss would remain constant from time $t_1$ to time $t_2$, assuming constant values of the air flow rate MAF, the rotational speed N, the actual oil temperature and the actual cooling water temperature TCO_AV, there would be a resulting strong increase in the torque at the shaft of the drive train, which would lead to an undesired acceleration of the vehicle.

The profile of the corrected measured values TCO_COR of the cooling water temperature, such as is obtained in accordance with the method according to the invention, is shown by a dotted line. It is clearly apparent that, starting from the time $t_1$, the corrected measured values TCO_COR drop substantially more slowly than the measured values TCO of the cooling water temperature. The estimated value TQ_LOSS of the torque loss thus also only rises slowly so that an increase in the torque at the shaft of the output train which is not requested by the driver is compensated for by the driver.

FIG. 6 illustrates a further flowchart. If the condition of the step S4 is not fulfilled, the processing is continued in a step S4a in which a rise value MTCO of the cooling water temperature is determined from a seventh characteristic diagram as a function of the corrected measured value TCO_COR. In a simple embodiment of the invention, the rise value MTCO of the cooling water temperature is limited to a value. In a step S4b a check is performed as to whether or not the measured value TCO of the cooling water temperature is higher than the corrected measured value TCO_COR plus the rise value MTCO of the cooling water temperature. If this is the case, the system branches into a step S4c in which the corrected measured value TCO_COR of the cooling water temperature is assigned the corrected measured value TCO_COR of the cooling water temperature plus the rise value MTCO of the cooling water temperature. If the condition of the step S4b is not fulfilled, the processing is continued in the step S6.

All of the characteristic diagrams are determined in static measurements on an engine test bench.

The invention is not restricted to the embodiments illustrated herein.

We claim:

1. A method for controlling an internal combustion engine, which comprises:

sensing a measured variable with a sensor associated with an internal combustion engine;

deriving an estimated value of a torque loss of the internal combustion engine from the measured variable;

determining a measured value of the measured variable at prescribed time intervals in each case;

correcting the measured values for limiting a drop in the corrected measured values within a prescribed time interval to a prescribed drop value; and deriving an actuation signal controlling an actuator unit of the internal combustion engine in dependence on the corrected measured values.

2. The method according to claim 1, which comprises making the drop value dependent on the corrected measured value of the measured variable at a start of the time interval.

3. The method according to claim 1, which comprises correcting the measured variables for additionally limiting a rise in the corrected measured values within the prescribed time interval to a prescribed rise value.

4. The method according to claim 3, which comprises making the rise value dependent on the corrected measured value of the measured variable at a start of the time interval.

5. The method according to claim 1, which comprises sensing cooling water temperature with a temperature sensor.

6. The method according to claim 1, which comprises sensing oil temperature with a temperature sensor.

7. The method according to claim 1, which comprises sensing a degree of fluidity of engine oil with a fluidity sensor.

8. An apparatus for controlling an internal combustion engine, comprising:

a sensor for sensing a measured variable from which an estimated value of a torque loss of an internal combustion engine is derived, and for determining a measured value of the measured variable at each prescribed time interval;

a device for correcting the measured values to limit a drop in corrected measured values within a prescribed time interval to a prescribed drop value; and a control device controlling an actuator unit of the internal combustion engine in dependence on the corrected measured values.

* * * * *